United States Patent
Lee

(10) Patent No.: US 9,930,398 B2
(45) Date of Patent: Mar. 27, 2018

(54) IMAGE DISPLAY APPARATUS AND METHOD OF OPERATING THE SAME

(71) Applicant: SAMSUNG ELECTRONICS CO., LTD., Suwon-si, Gyeonggi-do (KR)

(72) Inventor: Kwang-ho Lee, Seoul (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/213,666

(22) Filed: Jul. 19, 2016

(65) Prior Publication Data
US 2017/0026692 A1 Jan. 26, 2017

(30) Foreign Application Priority Data

Jul. 24, 2015 (KR) .................. 10-2015-0105301

(51) Int. Cl.
*H04N 21/442* (2011.01)
*H04N 21/436* (2011.01)
*G06F 9/44* (2018.01)
*H04N 21/41* (2011.01)
*H04N 21/443* (2011.01)
(Continued)

(52) U.S. Cl.
CPC ......... *H04N 21/43615* (2013.01); *G06F 9/44* (2013.01); *H04N 21/4131* (2013.01); *H04N 21/4432* (2013.01); *H04N 21/4435* (2013.01); *H04N 21/4437* (2013.01);
(Continued)

(58) Field of Classification Search
CPC .................. H04N 21/443; H04N 21/4436
See application file for complete search history.

(56) References Cited

U.S. PATENT DOCUMENTS 8,046,617 B2   10/2011 Fleck et al.
8,553,157 B2 * 10/2013 Waites ............... H04N 5/63
                                                      348/730
(Continued)

FOREIGN PATENT DOCUMENTS

WO   2009-085507   7/2009

OTHER PUBLICATIONS

Search Report and Written Opinion dated Oct. 11, 2016 in counterpart International Patent Application No. PCT/KR2016/007781.

*Primary Examiner* — Hunter B Lonsberry
(74) *Attorney, Agent, or Firm* — Nixon & Vanderhye, P.C.

(57) ABSTRACT

An image display apparatus including a non-volatile memory device that stores an operating system (OS), a first application program, and a second application program; and a processor that loads the OS and the first application program to a first volatile memory device, loads the second application program to a second volatile memory device, executes the OS, the first application program, and the second application program in a normal mode, and executes the OS and the first application program and suspends the second application program loaded to the second volatile memory device in an Internet-of-Things (IoT) mode, wherein the first application program is a program that receives state information regarding an IOT device and transmits the received state information to a server, and the second application program is a program that performs at least one of a broadcast receiving function, an image processing function, and an image displaying function is provided.

13 Claims, 11 Drawing Sheets

(51) Int. Cl.
*H04N 21/488* (2011.01)
*H04N 21/81* (2011.01)
*H04W 4/00* (2018.01)

(52) U.S. Cl.
CPC ....... *H04N 21/4882* (2013.01); *H04N 21/818* (2013.01); *H04W 4/005* (2013.01)

(56) References Cited

U.S. PATENT DOCUMENTS

| | | |
|---|---|---|
| 2005/0108585 A1 | 5/2005 | Yang |
| 2010/0058085 A1 | 3/2010 | Chien et al. |
| 2010/0122077 A1 | 5/2010 | Durham |
| 2011/0242268 A1* | 10/2011 | Kim .................... H04M 7/0063 348/14.04 |
| 2012/0320280 A1* | 12/2012 | Waites ............... H04N 21/4436 348/730 |
| 2013/0275785 A1 | 10/2013 | Katori et al. |
| 2016/0241784 A1* | 8/2016 | Baek .................... G06F 1/3287 |

* cited by examiner

IMAGE DISPLAY APPARATUS AND METHOD OF OPERATING THE SAME

CROSS-REFERENCE TO RELATED APPLICATION

This application is based on and claims priority under 35 U.S.C. § 119 to Korean Patent Application No. 10-2015-0105301, filed on Jul. 24, 2015, in the Korean Intellectual Property Office, the disclosure of which is incorporated by reference herein in its entirety.

BACKGROUND

1. Field

The present disclosure relates to image display apparatuses and methods of operating the same, and for example, to image display apparatuses capable of receiving state information regarding an Internet-of-Things (IoT) device and transmitting the received state information to an external device and methods of operating the image display apparatuses.

2. Description of Related Art

An image display apparatus is an apparatus capable of displaying an image that may be viewed by a user. A user may watch a broadcast via an image display apparatus. An image display apparatus displays a broadcast selected by a user from among broadcasts transmitted by broadcasting stations. Currently, broadcasting is being switched from analog broadcasting to digital broadcasting worldwide.

A digital broadcasting service refers to a broadcasting service that transmits digital images and digital voice signals. Since a digital broadcasting service is more resistant to external noise than an analog broadcasting service, a digital broadcasting service exhibits less data loss, easier error correction, high resolutions, and clear images. Also, unlike an analog broadcasting service, a digital broadcasting service may be a bidirectional service.

Furthermore, a smart television (TV) that provides not only a digital broadcasting service but also various other content has recently become available. A smart TV may analyze a user's demands and provide corresponding services without the user's manipulation instead of passively operating based on selections of the user.

Meanwhile, an Internet-of-Things (IoT) system requires a hub for monitoring the state of an IOT device and transmitting monitored information to a server, wherein an image display apparatus may function as a hub of an IoT system. Here, it is necessary for an image display apparatus to be always ON to continuously monitor the state of an IOT device, and thus, excessive power consumption becomes a problem.

SUMMARY

An image display apparatus that provides an Internet-of-Things (IoT) mode for receiving state information from an IOT device and transmitting the received state information to a server at low power consumption even when the image display apparatus is OFF and a method of operating the image display apparatus are provided.

Additional aspects will be set forth in part in the description which follows and, in part, will be apparent from the description.

According to an aspect of an example embodiment, an image display apparatus includes a non-volatile memory configured to store an operating system (OS), a first application program, and a second application program; and a processor configured to load the OS and the first application program to a first volatile memory device, to load the second application program to a second volatile memory device, to execute the OS, the first application program, and the second application program in a normal mode, and to execute the OS and the first application program and to suspend the second application program loaded to the second volatile memory device in an IoT mode, wherein the first application program is a program that receives state information regarding an IOT device and transmits the received state information to a server, and the second application program is a program that performs one or more of a broadcast receiving function, an image processing function, and an image displaying function.

The processor may include a plurality of cores, and, when the image display apparatus is switched from the normal mode to the IoT mode, some of the plurality of cores may be deactivated, and a core other than the deactivated cores may execute the OS and the first application program loaded to the first volatile memory device.

The image display apparatus may further include a detector comprising detection circuitry configured to detect an input for turning the image display apparatus ON or OFF, wherein, when an input for turning the image display apparatus OFF is detected, the processor may be configured to control the image display apparatus to be switched from the normal mode to the IoT mode, and, when an input for turning the image display apparatus ON is detected, the processor may be configured to control the image display apparatus to be switched from the IoT mode to the normal mode.

The image display apparatus may further include a first memory controller configured to control the first volatile memory device; and a second memory controller configured to control the second volatile memory device, wherein, when the image display apparatus is switched from the normal mode to the IoT mode, the second memory controller is configured to transmit a self refresh command to the second volatile memory device, and the processor is configured to turn the second memory controller OFF.

The image display apparatus may further include a third memory controller configured to control the non-volatile memory device, wherein, when the image display apparatus is switched from the normal mode to the IoT mode, the processor is configured to load data, which is stored in the non-volatile memory device and is necessary for executing the first application program, to the first volatile memory device and to turn the non-volatile memory device and the third memory controller OFF.

When the image display apparatus is switched from the IoT mode to the normal mode, cores deactivated in the IoT mode from among a plurality of cores included in the processor may be activated, and the plurality of cores are configured to resume the suspended second application program and to execute the second application program.

The at least one core activated in the IoT mode may consume less power than in the normal mode.

According to an aspect of another example embodiment, a method of operating an image display apparatus, the method includes loading an operating system (OS) and a first application program into a first volatile memory device and loading a second application program into a second volatile memory device; executing the OS, the first application program, and the second application program in a normal mode; switching from the normal mode to an IoT mode; and suspending the second application program loaded to the second volatile memory device and executing the OS and the first application program in the IoT mode, wherein the first application program is a program that receives state information regarding an IOT device and transmits the received state information to a server, and the second application program is a program that performs at least one of a broadcast receiving function, an image processing function, and an image displaying function.

The suspending of the second application program and the executing of the OS and the first application program may include deactivating some of the plurality of cores and executing the OS and the first application program by using a core other than the deactivated cores.

The method may further include detecting an input for turning the image display apparatus ON or OFF; when an input for turning the image display apparatus OFF is detected, switching from the normal mode to the IoT mode; and, when an input for turning the image display apparatus ON is detected, switching from the IoT mode to the normal mode.

The suspending of the second application program loaded to the second volatile memory device and the executing of the OS and the first application program in the IoT mode may include transmitting a self refresh command to the second volatile memory device; and turning a second memory controller that controls the second volatile memory device OFF.

The suspending of the second application program loaded to the second volatile memory device and the executing of the OS and the first application program in the IoT mode may include loading data, which is stored in the non-volatile memory device and is necessary for executing the first application program, to the first volatile memory device; and turning the non-volatile memory device and a third memory controller that controls the non-volatile memory device OFF.

The method may further include switching from the IoT mode to the normal mode; activating cores deactivated in the IoT mode from among a plurality of cores included in the processor; and resuming the suspended second application program and executing the first application program and the second application program.

The at least one core activated in the IoT mode may consume less power than in the normal mode.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein.

DETAILED DESCRIPTION

Figure 1:
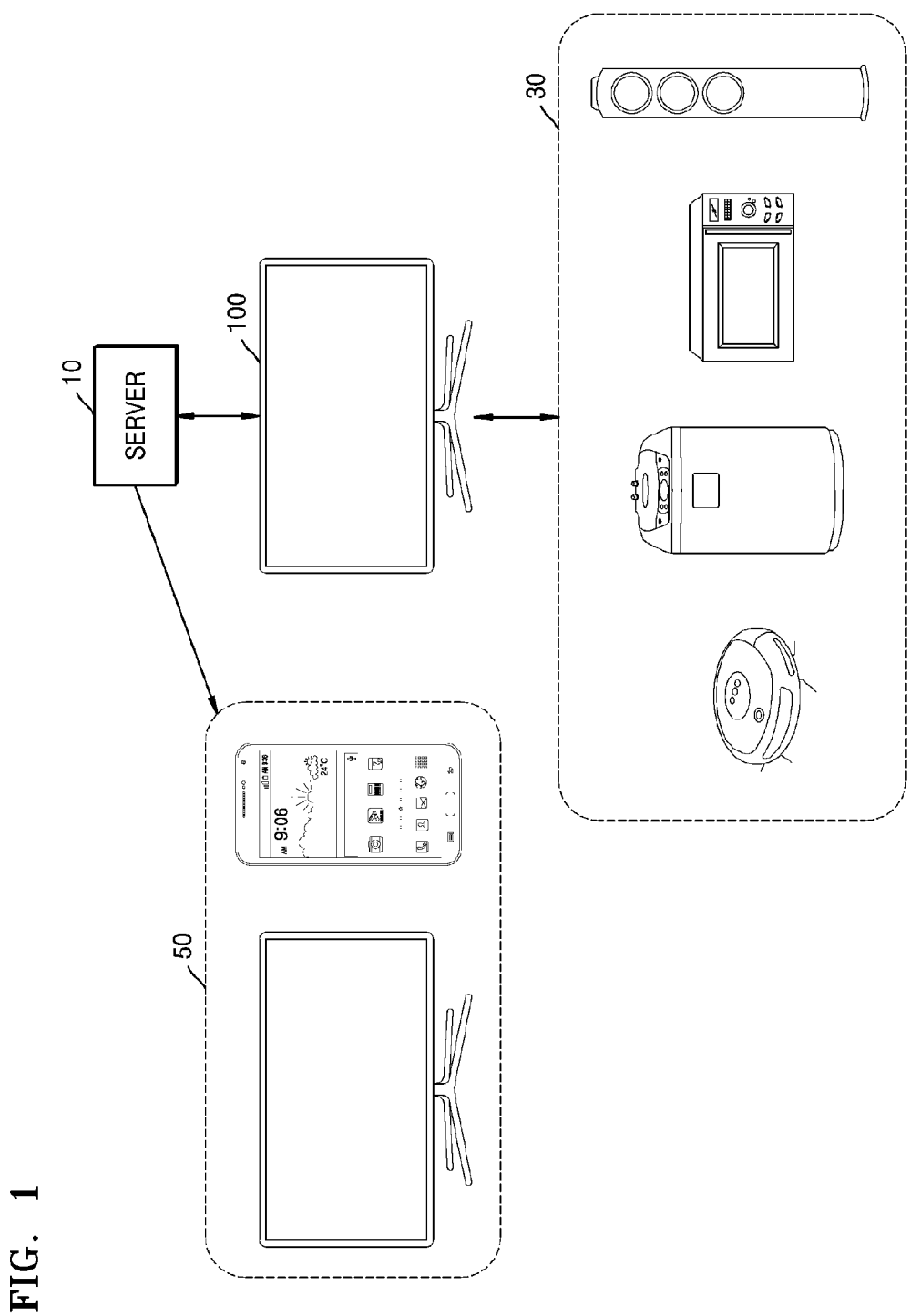
FIG. 1 is a diagram illustrating an example Internet-of-Things (IoT) system according to an example embodiment.

Terminologies used in the present description will be briefly described, and then the detailed description of the disclosed concept will be given.

Although the terms used in the disclosure are selected from generally known and used terms, some of the terms mentioned in the description of the inventive concept have been selected by the applicant at his or her discretion, the detailed meanings of which are described in relevant parts of the description herein. Furthermore, the disclosure is understood, not simply by the actual terms used but by the meaning of each term lying within.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the description mean units for processing at least one function and operation and can be implemented by hardware components, firmware or software components and combinations thereof.

Reference will now be made in detail to example embodiments, examples of which are illustrated in the accompanying drawings, wherein like reference numerals refer to like elements throughout. In this regard, the present example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

FIG. 1 is a diagram illustrating an example Internet-of-Things (IoT) system according to an example embodiment.

As illustrated in FIG. 1, the IoT system may include an IoT device 30, an image display apparatus 100, a server 10, and a device 50.

The IoT device 30 may generate sensing data and transmit the generated sensing data to the image display apparatus 100. Here, the image display apparatus 100 may be an image display apparatus having IoT hub functions, where the IoT hub functions may include receiving sensing data from the IoT device 30 and transmitting the received sensing data to the device 50 or the server 10. Furthermore, the IoT hub functions may also include transmitting a control signal received from the device 50 or the server 10 to the IoT device 30.

The IoT device 30 may include common devices (or objects) applied to the IoT. For example, the IoT device 30 may include a temperature sensor, a humidity sensor, an acoustic sensor, a motion sensor, a proximity sensor, a gas detecting sensor, a heat detecting sensor, a refrigerator, an air conditioner, a closed-circuit television (CCTV), a TV, a washer, a cleaner, an oven, a dehumidifier, a lamp, a smoke detector, etc. However, the disclosure is not limited thereto.

The image display apparatus 100 according to an example embodiment may receive sensing data from the IoT device 30 and transmit the received sensing data to the device 50 or the server 10. Furthermore, the image display apparatus 100 may display state information regarding the IoT device 30 and control the IoT device 30, by using the sensing data received from the IoT device 30.

The image display apparatus 100 may operate in a normal mode or an IoT mode. For example, the image display apparatus 100 may execute a first application program or a second application program and perform main functions (e.g., a broadcast receiving function, an image processing function, an image displaying function, etc.) and IoT hub functions (e.g., a function for receiving state information regarding an IoT device from the IoT device, a function for transmitting the received state information to a server, etc.).

On the other hand, in an IoT mode, the image display apparatus 100 may execute only the first application program by using some of a plurality of cores included in a processor and perform IoT hub functions only without performing the main functions of the image display apparatus 100.

The image display apparatus 100 according to an example embodiment may be a TV. However, it is merely an example embodiment, and the image display apparatus 100 may be embodied as one of various electronic devices including displays. For example, the image display apparatus 100 may be embodied as one of various electronic devices including a mobile phone, a tablet PC, a digital camera, a camcorder, a laptop computer, a desktop PC, an e-book reader, a digital broadcasting terminal, a personal digital assistant (PDA), a portable multimedia player (PMP), a navigation device, an MP3 player, a wearable device, etc. Furthermore, the image display apparatus 100 may be a stationary apparatus or a mobile apparatus and may be a digital broadcast receiver capable of receiving digital broadcasts.

The image display apparatus 100 may be embodied not only as a flat-panel display apparatus, but also as a curved display apparatus having a certain curvature or as a flexible display apparatus whose curvature may be adjusted. Output resolution of the image display apparatus 100 may be high definition (HD) resolution, full HD resolution, ultra HD resolution, or a resolution higher than ultra HD resolution.

The device 50 and the server 10 may receive sensing data from the image display apparatus 100 and provide services to a user by using the received sensing data. For example, the device 50 and the server 10 may provide fire alarm service, anti-theft service, and home network service by using the received sensing data.

The device 50 may be a smart phone, a tablet PC, a PC, a smart TV, a mobile phone, a personal digital assistant (PDA), a laptop PC, a media player, a micro server, a global positioning system (GPS) device, an e-book reader, a digital broadcasting terminal, a navigation device, a kiosk, an MP3 player, a digital camera, or one of various other mobile and non-mobile computing devices, but is not limited thereto. Furthermore, the device 50 may be a wearable device having a communication function and a data processing function, such as a wristwatch type wearable device, an eyeglass type wearable device, a hair band type wearable device, or a ring type wearable device. However, the disclosure is not limited thereto, and the device 50 may include any device capable of receiving sensing data for providing a service from the image display apparatus 100 or the server 10 via a network.

Figure 2:
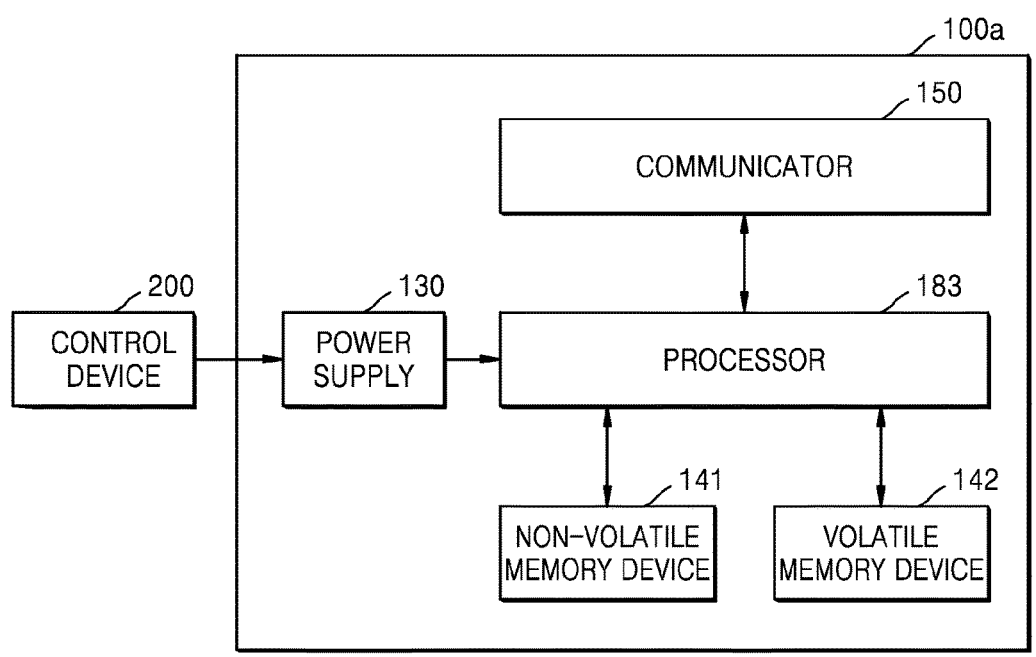
FIG. 2 is a block diagram illustrating an example configuration of an image display apparatus according to an example embodiment.

FIG. 2 is a block diagram illustrating an example configuration of an image display apparatus 100a according to an example embodiment.

The image display apparatus 100a of FIG. 2 may be an example embodiment of the image display apparatus 100 of FIG. 1. Referring to FIG. 2, the image display apparatus 100a may include a detector (e.g., including detection circuitry) 130, a processor 183, a non-volatile memory device 141, a volatile memory device 142, and a communicator (e.g., including communication circuitry) 150.

The detector 130 according to an example embodiment may receive an input, such as, for example, a user input signal and transmit a received signal to the processor 183. Furthermore, the detector 130 may receive a user input, such as an input for turning the image display apparatus 100a ON or OFF, a channel selecting input, a channel-up/down input, and a screen setting input, from a control device 200 described below.

The processor 183 controls the overall operations of the image display apparatus 100a, controls signal flows between internal components of the image display apparatus 100a, and processes data. Furthermore, the processor 183 controls execution of software (e.g., an operating system (OS)) stored in the image display apparatus 100a and may correspond to a central processing unit (CPU).

For example, the processor 183 may load software stored in a non-volatile memory device 141 to a volatile memory device and execute the software and may control the image display apparatus 100a based on a user input received via the detector 130 or the executed software.

Furthermore, the processor 183 may include a graphics processing unit (GPU) (not shown) for processing graphics data corresponding to a video. The processor 183 may be embodied as a system-on-chip (SoC) having integrated thereon a core (not shown) and a GPU (not shown). The processor 183 may include a single core, dual cores, triple cores, quad cores, and cores in multiples of 4.

Furthermore, the processor 183 may include a plurality of processors. For example, the processor 183 may include a main processor (not shown) and a sub processor (not shown) that operates in a sleep mode.

The non-volatile memory device 141 according to an example embodiment may store various data and software (e.g., an OS, application programs, etc.) for operating and controlling the image display apparatus 100a. The non-volatile memory device 141 may include an OS, a first application program, and a second application program. Here, the first application program may be a program that receives state information regarding an IoT device from the IoT device and transmitting the received information to a server. Furthermore, the second application program may be a program that performs major functions of the image display apparatus 100a (e.g., a broadcast receiving function, an image processing function, an image displaying function, etc.).

The non-volatile memory device 141 is a memory device in which data stored therein is not erased even if power supply is stopped, where the non-volatile memory device 141 may include a flash memory device, such as a NAND flash and a NOR flash.

The non-volatile memory device 141 may be controlled by a controller. The controller may receive a control command from the processor 183 and may store data in the non-volatile memory device 141 or read out data stored in the non-volatile memory device 141.

The processor 183 according to an example embodiment may load software stored in the non-volatile memory device 141 to the volatile memory device 142 and execute the software.

The processor 183 may access data related to software (e.g., an OS, an application program, etc.) loaded to the volatile memory device 142. The volatile memory device 142 is a memory device in which data stored therein is erased when power supply is stopped, where the volatile memory device 142 may include a static RAM (SRAM), a dynamic RAM (DRAM), etc.

The volatile memory device 142 may include a first volatile memory device and a second volatile memory device. An OS and a first application program may be loaded to and executed on the first volatile memory device, whereas a second application program may be loaded to and executed on the second volatile memory device. Detailed descriptions thereof will be given below with reference to FIGS. 6 and 8.

The communicator 150 may connect the image display apparatus 100a to an external device (e.g., a server, an audio device, etc.) under the control of the processor 183. The processor 183 may transmit/receive contents to/from an external device connected via the communicator 150, download an application from the external device, or browse web pages. The communicator 150 may communicate with an external device using various communication circuitry, including, for example, one or more of Bluetooth protocol, near field communication protocol, Wi-Fi protocol, Zigbee protocol, Z-WAVE protocol, infrared Data Association (irDA) communication protocol, Wi-Fi direct (WFD) protocol, ultra wideband (UWB) protocol, Ant+ communication protocol, and Bluetooth low energy (BLE) protocol.

The communicator 150 according to an example embodiment may receive sensing data from an IoT device (e.g., state information regarding the IoT device) and transmit the received sensing data to an external server. Here, the communicator 150 may communicate with the IoT device via a Zigbee communication or a Z-WAVE communication and communicate with the external server via a Bluetooth communication or a Wi-Fi communication.

Incidentally, the control device 200 according to an example embodiment may be embodied as a device of one of various types for controlling the image display apparatus 100, such as a remote controller or a mobile phone.

Furthermore, the control device 200 may control the image display apparatus 100 via a short-range wireless communication including an infrared communication or a Bluetooth communication. The control device 200 may control functions of the image display apparatus 100 by using at least one of a key (including a button), a touch pad, a microphone (not shown) for receiving voice of a user, and a sensor (not shown) capable of recognizing a motion of the control device 200 that are arranged at the control device 200.

The control device 200 includes a power ON/OFF button for turning the image display apparatus 100 ON and OFF. The control device 200 may also change a channel of the image display apparatus 100, adjust a volume of the image display apparatus 100, select a ground wave broadcast, a cable broadcast, or a satellite broadcast, or adjust a setting.

Furthermore, the control device 200 may be a pointing device. For example, the control device 200 may function as a pointing device when a particular key input is received.

The image display apparatus 100a may be controlled by an input, such as, for example, a user input for moving the control device 200 up, down, left, or right or tilting the control device 200 in an arbitrary direction. Information regarding a motion of the control device 200 detected by a sensor of the control device 200 may be transmitted to the image display apparatus 100a. The image display apparatus 100a may calculate a coordinate of a cursor on a display based on the information regarding the motion of the control device 200 and move the cursor in correspondence to the calculated coordinate. Therefore, the cursor on the display of the image display apparatus 100 may be moved or various menus displayed thereon may be selectively activated.

Alternatively, if the control device 200 includes a touch pad, based on a displacement of an object, such as a finger of a user moving on the touch pad, the cursor on the display of the image display apparatus 100a may be moved or various menus displayed thereon may be selectively activated.

Figure 3:
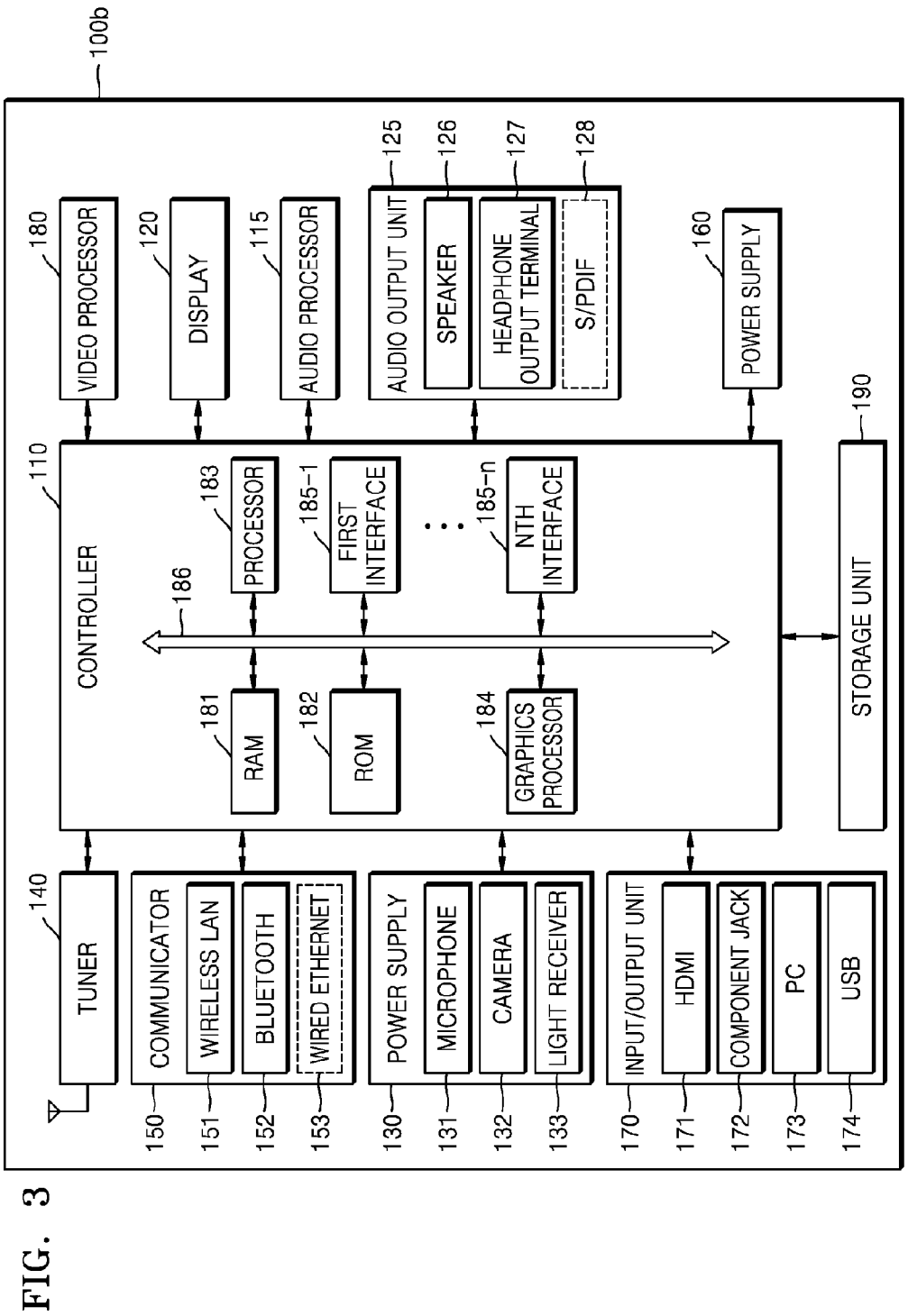
FIG. 3 is a block diagram illustrating an example configuration of an image display apparatus according to an example embodiment.

FIG. 3 is a block diagram illustrating an example configuration of an image display apparatus 100b according to an example embodiment. The image display apparatus 100b of FIG. 3 may be an example embodiment of the image display apparatus 100 of FIG. 1.

Referring to FIG. 3, the image display apparatus 100b according to an example embodiment may include a controller 110, a display (e.g., including a display panel) 120, the detector (e.g., including detection circuitry) 130, a video processor 180, an audio processor 115, an audio output unit (e.g., including audio output circuitry) 125, a power supply 160, a tuner 140, a communicator (e.g., including communication circuitry) 150, an input/output unit (e.g., including input/output circuitry) 170, and a storage unit 190.

Meanwhile, the configuration of the image display apparatus 100a described above with reference to FIG. 2 may also be applied to the configuration of the image display apparatus 100b illustrated in FIG. 3.

The video processor 180 processes video data received by the image display apparatus 100b. The video processor 180 may perform various image processing operations with regard to video data, such as decoding, scaling, noise filtering, frame rate transforming, and resolution transforming.

The display 120 transforms an image signal, a data signal, an OSD signal, and a control signal processed by the controller 110 and generates a driving signal. The display 120 may be embodied as a PDP, a LCD, a OLED, a flexibly display, or a 3-dimensional (3D) display. Furthermore, the display 120 may be configured as a touch screen and may be used not only as an output device, but also as an input device.

Furthermore, the display 120 displays a video included in a broadcasting signal received via the tuner 140 under the control of the controller 110. Furthermore, the display 120 may display content (e.g., moving pictures) input via the communicator 150 or the input/output unit 170. The display 120 may output an image stored in the storage unit 190 under the control of the display 120. Furthermore, the display 120 may display a voice user interface (UI) (e.g., a UI including a voice command guide) for performing a voice recognition task or a motion UI (e.g., a UI including a user motion guide for motion recognition) for performing a motion recognition task.

The display 120 may display state information regarding an IoT device received by the communicator 150.

The audio processor 115 processes audio data. The audio processor 115 may perform various audio processing operations including decoding, amplification, and noise filtering with regard to audio data. Meanwhile, the audio processor 115 may include a plurality of audio processing modules for processing audio data corresponding to a plurality of contents.

The audio output unit 125 outputs an audio included in a broadcasting signal received via the tuner 140 under the control of the tuner 140. The audio output unit 125 may output an audio (e.g., a voice, a sound) input via the communicator 150 or the input/output unit 170. Furthermore, the audio output unit 125 may output an audio stored in the storage unit 190 under the control of the controller 110. The audio output unit 125 may include at least one of a speaker 126, a headphone output terminal 127, and a Sony/Philips digital interface (S/PDIF) output terminal 128. The audio output unit 125 may include a combination of the speaker 126, the headphone output terminal 127, and the S/PDIF output terminal 128.

The power supply 160 supplies power input from an external power source to internal components of the image display apparatus 100b under the control of the controller 110. Furthermore, the detector 130 may supply power output by one, two, or more batteries (not shown) arranged in the image display apparatus 100b to the internal components of the image display apparatus 100b under the control of the controller 110

The tuner 140 may tune and select frequency corresponding to a channel to be received by the image display apparatus 100 from among a large number of frequency ingredients in a broadcasting signal that is received via a wire or wirelessly by amplifying, mixing, and resonating the broadcasting signal. A broadcasting signal includes an audio data signal, a video signal, and additional information (e.g., electronic program guide (EPG)).

The tuner 140 may receive a broadcasting signal in a frequency band corresponding to a channel number (e.g., a cable broadcast No. 506) based on a user input (e.g., a control signal received from the control device 200, such as a channel number input, a channel up-down input, and a channel input on an EPG screen image).

The tuner 140 may receive a broadcasting signal from various sources, such as a ground wave broadcasting service, a cable broadcasting service, a satellite broadcasting service, and an internet broadcasting service. The tuner 140 may receive a broadcasting signal from sources like an analog broadcasting service or a digital broadcasting service. A broadcasting signal received by the tuner 140 is decoded (e.g., audio decoding, video decoding, or additional information decoding) and is split to an audio signal, a video signal, and/or additional information. The audio signal, the video signal, and/or the additional information obtained from the broadcasting signal may be stored in the storage unit 190 under the control of the controller 110.

The image display apparatus 100b may include one tuner 140 or a plurality of tuners 140. The tuner 140 may be integrated with the image display apparatus 100b, may be embodied as an independent device (e.g., a set-top box (not shown)) having a tuner electrically connected to the image display apparatus 100b, or may be embodied as a tuner connected to the input/output unit 170.

The communicator 150 may connect the image display apparatus 100b to an external device (e.g., an audio device) under the control of the controller 110. The communicator 150 may include one of a wireless LAN module 151, a Bluetooth module 152, and a wire Ethernet module 153. Furthermore, the communicator 150 may include a combination of the wireless LAN module 151, the Bluetooth module 152, and the wire Ethernet module 153. The communicator 150 may receive a control signal of the control device 200 under the control of the controller 110. A control signal may be embodied as a Bluetooth signal, a RF signal, or a Wi-Fi signal.

For example, the communicator 150 may receive a Bluetooth signal corresponding to a user input (e.g., a touch, a press, a touch gesture, a voice, or a motion) from the control device 200 via the Bluetooth module 152.

The communicator 150 may include short-range wireless communication modules other than the Bluetooth module 152, e.g., a near field communication (NFC) module (not shown), a Bluetooth low energy (BLE) module, etc.

The detector 130 may detect a voice of a user, an image of the user, or an interaction of the user.

The microphone 131 receives a voice uttered by a user. The microphone 131 may transform a received voice into an electric signal and output the electric signal to the controller 110. A user's voice may include a voice corresponding to a menu or a function of the image display apparatus 100b. A voice recognition range of the microphone 131 may be within a distance about 4 meters from the microphone 131, where the voice recognition range of the microphone 131 may vary based on the volume of a voice of a user and surrounding environmental conditions (e.g., a volume of a speaker, ambient noise, etc.).

According to an embodiment, for the controller 110 to recognize the identity of a user watching the image display apparatus 100b, the microphone 131 may receive a voice uttered by the user and output received voice data to the controller 110.

The microphone 131 may be integrated with the image display apparatus 100b or may be embodied as an independent device. The independent microphone 131 may be connected to the image display apparatus 100b via the communicator 150 or the input/output unit 170.

It would be apparent to one of ordinary skill in the art that the microphone 131 may be omitted according to performances and structures of the image display apparatus 100b.

The camera 132 receives an image (e.g., successive frames) corresponding to a user's motion including a gesture within a recognition range of the camera 132. For example, the recognition range of the camera 132 may be within a distance from about 0.1 m to about 5 m from the camera 162. A user's motion may include a motion of a body part of the user, e.g., a face, a face expression, a hand, a fist, a finger, etc. The camera 132 may transform a received image into an electric signal and output the electric signal to the controller 110, under the control of the controller 110.

According to an embodiment, for the controller 110 to recognize the identity of a user watching the image display apparatus 100b, the camera 132 may capture a face image of a user and output the captured face image to the controller 110.

The controller 110 may select a menu displayed on the image display apparatus 100b by using a result of recognizing a received motion or perform a task corresponding to the result of the motion recognition, e.g., changing channel, adjusting volume, moving a cursor, etc.

The camera 132 may include a lens (not shown) and an image sensor (not shown). The camera 132 may provide optical zoom or digital zoom by using a plurality of lenses and image processing techniques. The recognition range of the camera 132 may vary according to angles of the camera 132 and surrounding environmental conditions. If the camera 132 consists of a plurality of cameras, a 3-dimensional (3D) still image or a 3D motion may be received by using the plurality of cameras.

The camera 132 may be integrated with the image display apparatus 100b or may be embodied as an independent device. An independent device (not shown) including the camera 132 may be electrically connected to the image display apparatus 100b via the communicator 150 or the input/output unit 170.

It would be apparent to one of ordinary skill in the art that the camera 132 may be omitted according to performances and structures of the image display apparatus 100b.

The light receiver 133 receives an optical signal (including a control signal) from the external control device 200 via an optical window (not shown) of the bezel of the display 120. The light receiver 133 may receive an optical signal corresponding to a user input (e.g., a touch, a press, a touch gesture, a voice, or a motion) from the control device 200. A control signal may be extracted from the received optical signal under the control of the controller 110.

The input/output unit 170 receives a video (e.g., moving pictures, etc.), an audio (e.g., voice, music, etc.), and additional information (e.g., an EPG, etc.) from outside of the image display apparatus 100b under the control of the controller 110. The input/output unit 170 may include at least one of a high-definition multimedia interface port 171, a component jack 172, a PC port 173, and a USB port 174. The input/output unit 170 may include a combination of the HDMI port 171, the component jack 172, the PC port 173, and the USB port 174.

It would be apparent to one of ordinary skill in the art that configurations and operations of the input/output unit 170 may vary according to example embodiments of the disclosure.

The controller 110 controls the overall operations of the image display apparatus 100b, controls signal flows between internal components of the image display apparatus 100b, and processes data. When a user input is applied or a certain condition is satisfied, the controller 110 may execute an operating system (OS) and various applications stored in the storage unit 190.

The controller 110 may include a RAM 181 that stores a signal or data input from outside of the image display apparatus 100b or is used as a storage area corresponding to various tasks performed by the image display apparatus 100b, a ROM 182 having stored therein control programs for controlling the image display apparatus 100b, and a processor 183.

The processor 183 corresponds to the processor 183 of FIG. 2, and the RAM 181 corresponds to the volatile memory device 142 of FIG. 2. Therefore, detailed descriptions thereof will be omitted.

A graphics processor 184 generates a screen image including various objects, such as icons, images, and texts, by using a processor (not shown) and a renderer (not shown). The processor calculates property values, such as coordinate values, shapes, sizes, and colors, for displaying respective objects according to a layout of a screen image by using a user input detected by the detector 130. The renderer generates screen images having various layouts including objects based on property values calculated by the processor. A screen image generated by the renderer is displayed within a display area of the display 120.

First through nth interfaces 185-1 through 185-n are connected to the above-stated components. One of the first through nth interfaces 185-1 through 185-n may be a network interface that is connected to an external device via a network.

The RAM 181, the ROM 182, the processor 183, the graphics processor 184, and the first through nth interfaces 185-1 through 185-n may be connected to one another via an internal bus 186.

In the present embodiment, the term 'control unit of an image display apparatus' includes the processor 183, the ROM 182, and the RAM 181.

The storage unit 190 may store various data, programs, or applications for operating and controlling the image display apparatus 100b under the control of the controller 110. The storage unit 190 may store signals or data input/output in correspondence to operations of the video processor 180, the display 120, the audio processor 115, the audio output unit 125, the detector 130, the tuner 140, the communicator 150, the detector 130, and the input/output unit 170. The storage unit 190 may store control programs for controlling the image display apparatus 100b and the controller 110, applications initially provided by a manufacturer of the image display apparatus 100b or downloaded from outside, graphical user interfaces (GUI) related to the applications, objects (e.g., images, texts, icons, buttons, etc.) for providing the GUIs, user information, documents, databases, or data related thereto.

According to an embodiment, the term "storage unit" includes the storage unit 190, the ROM 182 and the RAM 181 of the controller 110, and/or a memory card (not shown) attached to the image display apparatus 100b (e.g., a micro SD card, a USB memory, etc.). Furthermore, the storage unit 190 may include a non-volatile memory, a volatile memory, a hard disk drive (HDD), or a solid state disk (SSD).

Although not shown, the storage unit 190 may include a broadcast receiving module, a channel control module, a volume control module, a communication control module, a voice recognition module, a motion recognition module, an optical receiving module, a display control module, an audio control module, an external input control module, a power control module, a module for controlling a wirelessly connected external device (e.g., connected via a Bluetooth communication), a voice database (DB), or a motion DB. The modules (not shown) and the DB (not shown) of the storage unit 190 may be embodied in the form of software for controlling the image display apparatus 100b to perform a broadcast reception control function, a channel control function, a volume control function, a communication control function, a voice recognition function, a motion recognition function, an optical reception control function, a display control function, an audio control function, an external input control function, a power control function, or a function for controlling a wirelessly connected external device (e.g., connected via a Bluetooth communication). The controller 110 may perform the above-stated functions by using the software modules stored in the storage unit 190.

Furthermore, the image display apparatus 100b including the display 120 may be electrically connected to an independent external device including a tuner (e.g., a set-top box) (not shown). For example, the image display apparatus 100b may be embodied as an analog TV, a digital TV, a 3D TV, a smart TV, a LED TV, an OLED TV, a plasma TV, or a monitor. However, it would be apparent to one of ordinary skill in the art that the disclosure is not limited thereto.

The image display apparatus 100b may include a sensor (not shown) for detecting a condition inside or outside the image display apparatus 100b (e.g., an illuminance sensor, a temperature sensor, etc.).

Meanwhile, the image display apparatuses 100a and 100b illustrated in FIGS. 2 and 3 are merely example embodiments. The components illustrated in FIGS. 2 and 3 may be integrated with one another, additional components may be introduced, or some of the components shown in FIGS. 2 and 3 may be omitted according to specifications of the image display apparatus 100. In other words, as occasion demands, two or more components may be integrated as a single component or a single component may be split to two or more components. Furthermore, functions performed by respective blocks are merely for describing embodiments, and operations and devices related thereto do not limit the disclosure.

Figure 4:
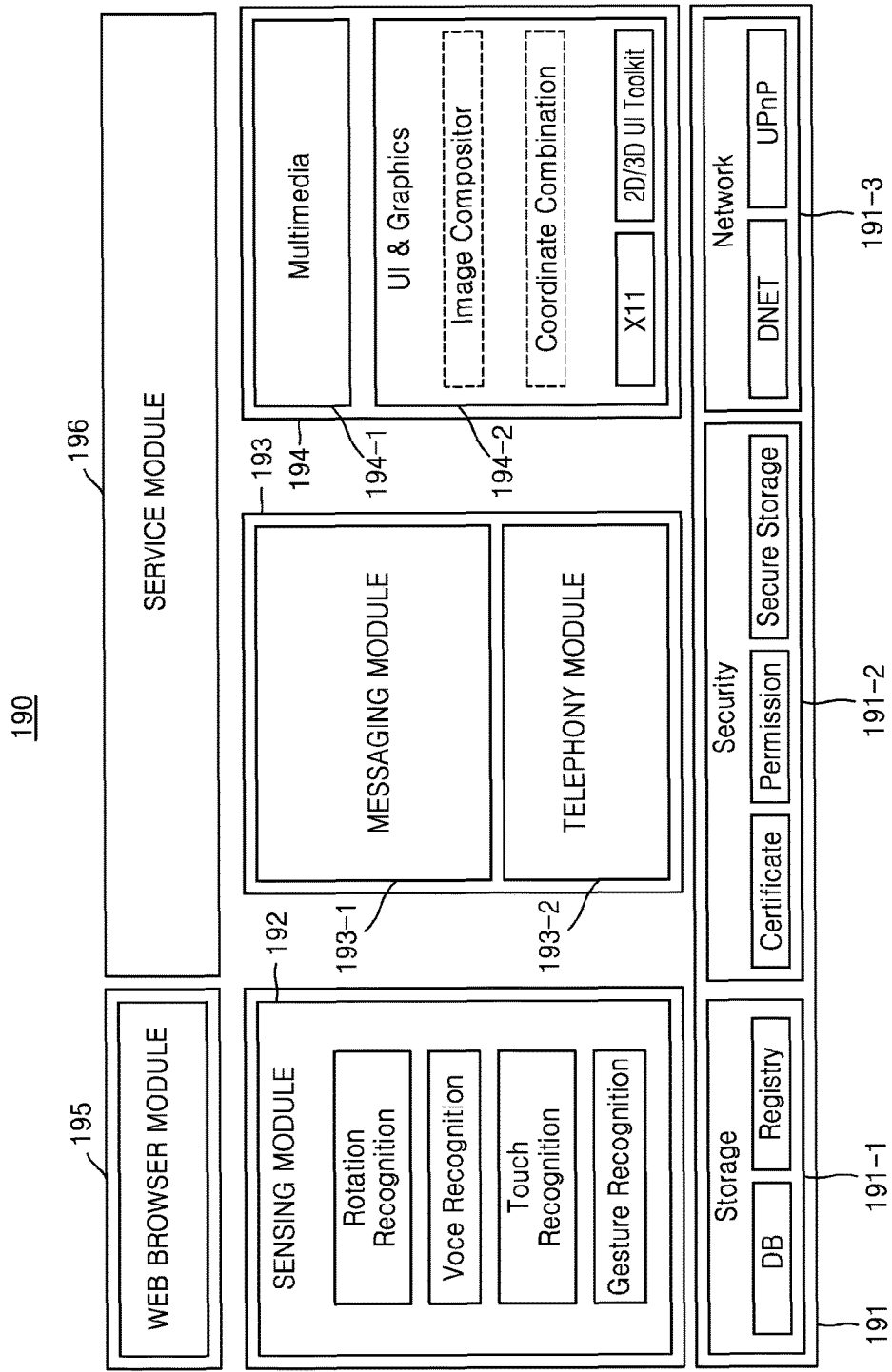
FIG. 4 is a diagram illustrating example configurations of software stored in a storage unit of FIG. 3.

FIG. 4 is a diagram illustrating example configurations of software stored in the storage unit 190 of FIG. 3.

Referring to FIG. 4, software modules including a base module 191, a sensing module 192, a communication module 193, a presentation module 194, a web browser module 195, and a service module 196 may be stored in the storage unit 190.

The base module 191 refers to a basic module that processes signals transmitted from respective hardware components included in the image display apparatus 100 and transmits the processed signals to higher layer modules. The base module 191 includes a storage module 191-1, a security module 191-2, and a network module 191-3. The storage module 191-1 is a program module for managing a DB or a registry. The processor 183 may access a DB inside the storage unit 190 and read out various data therefrom by using the storage module 191-1. The security module 191-2 is a program module that provides hardware certification, permission, and secure storage. Furthermore, the network module 191-3 is a module for supporting a network connection and includes a DNET module, an UPnP module, etc.

The sensing module 192 is a module that collects information from various sensors and analyzes and manages collected information. The sensing module 192 may include a head orientation recognition module, a face recognition module, a voice recognition module, a motion recognition module, and an NFC recognition module.

The communication module 193 is a module for performing communication with the outside. The communication module 193 may include a messaging module 193-1, such as a messenger program, a short message service (SMS) & multimedia message service (MMS) program, and an e-mail program, and a telephony module 193-2 including a call information aggregator program module, a VoIP module, etc.

Furthermore, the communication module 193 according to an embodiment may include an IoT module for communicating with an IoT device, collecting information sensed by the IoT device, and transmitting collected sensing data to an external server.

Furthermore, the IoT module may analyze collected sensing data and transmit a control signal to the IoT device.

The presentation module 194 is a module for configuring a screen image to be displayed. The presentation module 194 includes a multimedia module 194-1 for reproducing and outputting multimedia content and a UI rendering module 194-2 that processes UIs and graphics. The multimedia module 194-1 may include a player module, a camcorder module, a sound processing module, etc. Therefore, the multimedia module 194-1 reproduces various multimedia contents and generates and reproduces screen images and sounds. The UI rendering module 194-2 may include an image compositor module for combining images, a coordinate combining module that combines and generates on-screen coordinates for displaying an image, an X11 module that receives various events from a hardware component, and a 2D/3D UI toolkit that provides tools for configuring a 2D or 3D UI.

The web browser module 195 refers to a module that browses web pages and accesses a web server. The web browser module 195 may include various modules including a web view module that configures a web page, a download agent module that performs a downloading task, a bookmark module, and a Webkit module.

The service module 196 is a module including various applications for providing various services. In detail, the service module 196 may include various program modules, such as a SNS program, a content playback program, a game program, an e-book program, a calendar program, an alarm management program, and other widgets.

Although FIG. 4 illustrates various program modules, it will be apparent to those of ordinary skill in the art that some of the various program modules illustrated in FIG. 4 may be omitted or modified or additional program modules may be added, according to types and characteristics of the image display apparatus 100. For example, a location-based module that provides a location-based service in conjunction with a hardware module, such as a GPS chip, may be further included.

Figure 5:
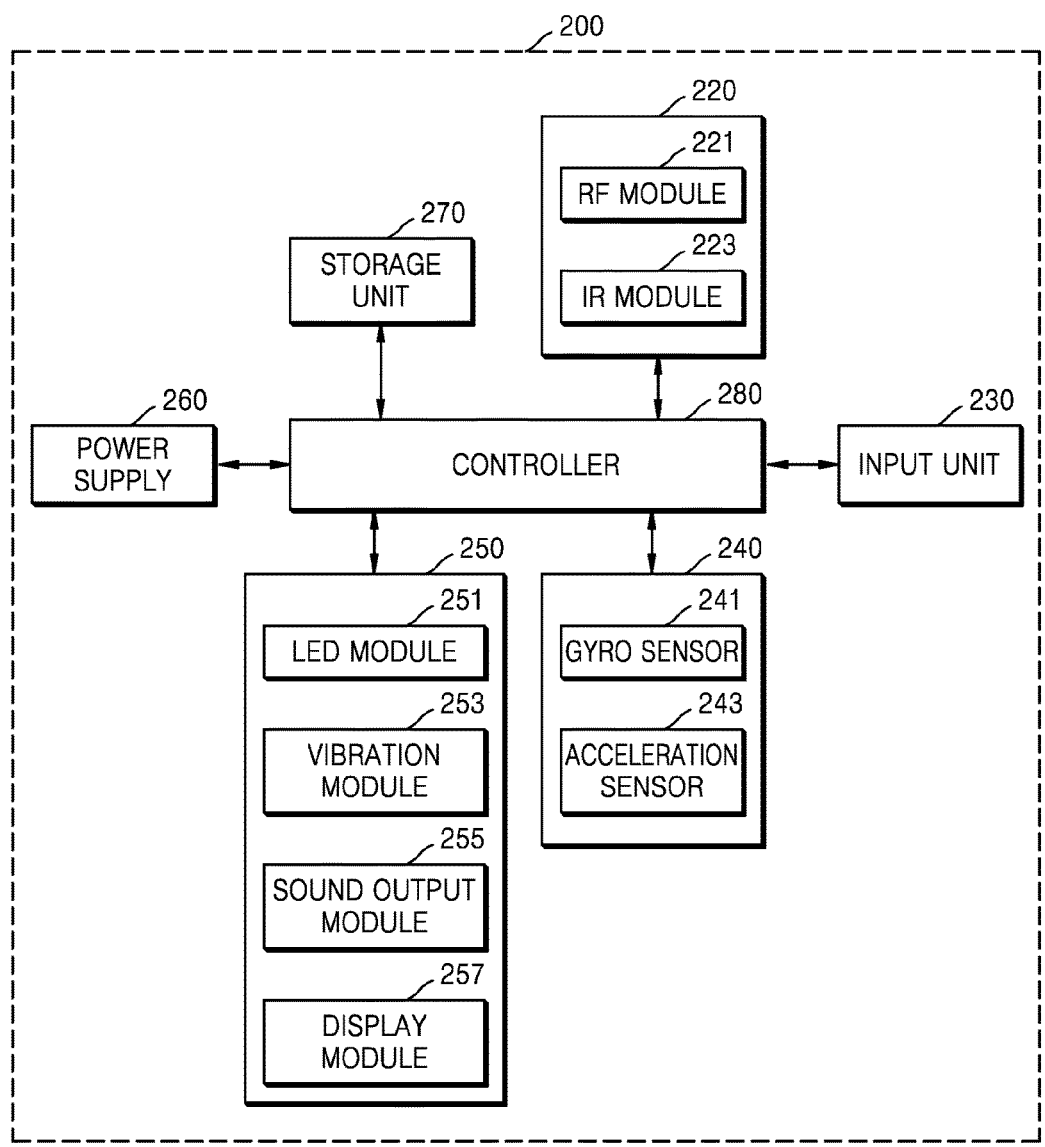
FIG. 5 is a block diagram illustrating an example configuration of a control device according to an example embodiment.

FIG. 5 is a block diagram illustrating an example configuration of the control device 200 according to an example embodiment.

Referring to FIG. 5, the control device 200 may include a wireless communicator (e.g., including wireless communication circuitry) 220, an input unit (e.g., including input circuitry) 230, a sensor 240, an output unit (e.g., including output circuitry) 250, a power supply 260, a storage unit 270, and a controller 280.

The wireless communicator 220 may exchange signals with an arbitrary one from among image display apparatuses according to the embodiments described above. The wireless communicator 220 may include various communication circuitry, including, for example, a RF module 221 capable of exchanging signals with the image display apparatus 100 according to the RF communication protocol. Furthermore, the control device 200 may include an IR module capable of exchanging signals with the control device 200 according to the IR communication protocol.

According to the present example embodiment, the control device 200 transmits a signal including information regarding the control device 200, e.g., information regarding a motion of the control device 200, to the image display apparatus 100 via the RF module 221.

Furthermore, the control device 200 may receive a signal transmitted by the image display apparatus 100 via the RF module 221. Furthermore, if necessary, the control device 200 may transmit a command for power ON/OFF, channel change, and volume adjustment to the image display apparatus 100 via an IR module 223.

The input unit 230 may include input circuitry, such as, for example, a keypad, a touch pad, or a touch screen. A user may input a command related to the image display apparatus 100 to the control device 200 by manipulating the input unit 230. If the input unit 230 includes a hardware key button, a user may input a command related to the image display apparatus 100 to the control device 200 by pushing the hardware key button. For example, the input unit 230 may include a power ON/OFF button.

If the input unit 230 includes a touch screen, a user may input a command related to the image display apparatus 100 to the control device 200 by touching a software key on the touch screen. Furthermore, the input unit 230 may include various input units that may be manipulated by a user, such as a scroll key and a jog key.

The sensor 240 may include a gyro sensor 241 or an acceleration sensor 243. The gyro sensor 241 may sense information regarding a motion of the control device 200. For example, the gyro sensor 241 may sense information regarding a motion of the control device 200 within a coordinate system based on the x-axis, the y-axis, and the z-axis. The acceleration sensor 243 may sense information regarding a moving speed of the control device 200. Furthermore, the sensor 240 may further include a distance measuring sensor, and thus the sensor 240 may sense a distance to the image display apparatus 100.

The output unit 250 may output an image signal or a sound signal corresponding to a manipulation of the user input unit 230 or a signal received by the image display apparatus 100. A user may recognize an operation of the user input unit 230 or the image display apparatus 100 via the output unit 250.

For example, the output unit 250 may include a LED module that emits light, a vibration module that vibrates, a sound output module that outputs a sound, or a display module that outputs an image in correspondence to a manipulation of the user input unit 230 or a transmission or reception of a signal to or from the image display apparatus 100 via the wireless communicator 220.

The power supply 260 supplies power to the control device 200. When the control device 200 is not moved for a certain time period, the power supply 260 stops power supply to reduce unnecessary power consumption. The power supply 260 may resume power supply when a certain key included in the control device 200 is manipulated.

The storage unit 270 may store various types of programs and application data for controlling or operating the control device 200.

The controller 280 controls overall processes for controlling the control device 200. The controller 280 may transmit a signal corresponding to a manipulation of a certain key of the user input unit 230 or a signal corresponding to a motion of the control device 200 sensed by the sensor 240 to the image display apparatus 100 via the wireless communicator 220.

The image display apparatus 100 may include a coordinate calculator (not shown) capable of calculating a coordinate of a cursor corresponding to a motion of the control device 200.

The coordinate calculator (not shown) may calculate a coordinate (x, y) of a cursor to be displayed on the display 120 by correcting a hand shake or an error in a signal corresponding to a detected motion of the control device 200.

Furthermore, a signal that is transmitted from the control device 200 and detected by the detector 130 is transmitted to the controller 110 of the image display apparatus 100. The controller 110 may recognize information regarding an operation of the control device 200 and a key manipulation from the signal transmitted by the control device 200 and may control the image display apparatus 100 in correspondence to the recognized information.

In another example, the control device 200 may calculate a coordinate of a cursor corresponding to an operation of the control device 200 and transmit the calculated coordinate to the image display apparatus 100. In this case, the image display apparatus 100 may transmit receive information regarding a coordinate of a cursor to the controller 110 without correcting a hand shake or an error.

Figure 6:
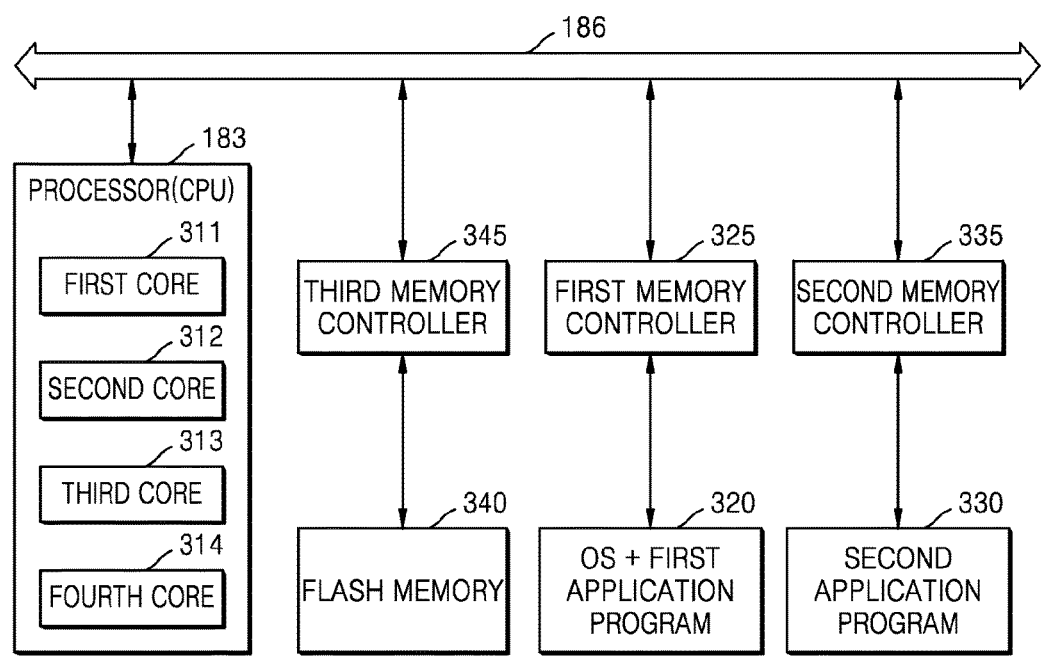
FIGS. 6 and 7 are diagrams illustrating a case in which an image display apparatus according to an example embodiment operates in a normal mode.
Figure 7:
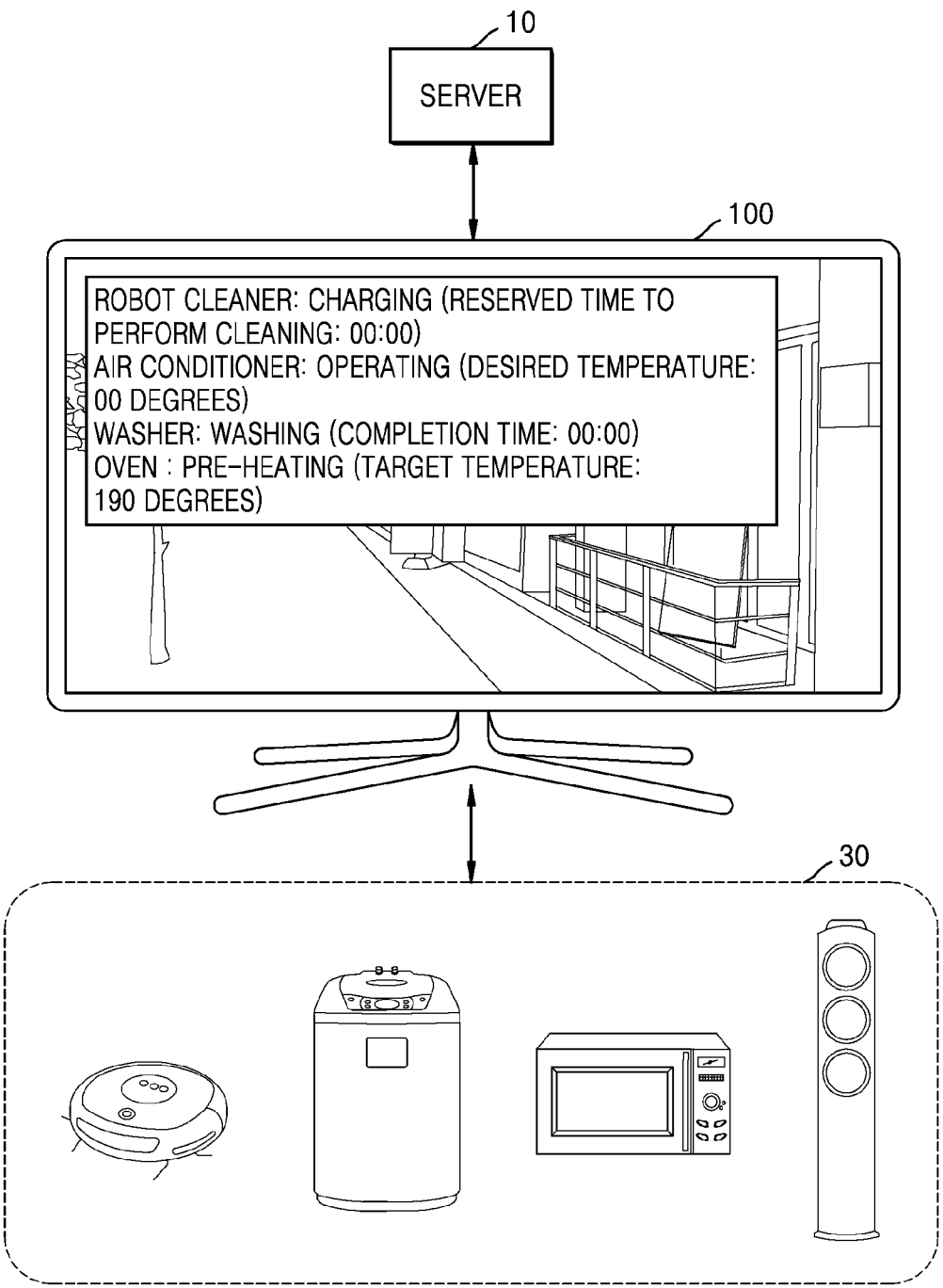

FIGS. 6 and 7 are diagrams illustrating a case in which an image display apparatus according to an example embodiment operates in a normal mode.

Referring to FIG. 6, the image display apparatus 100 according to an example embodiment may include the processor 183, a flash memory 340, a first DRAM 320, a second DRAM 330, a first memory controller 325, a second memory controller 335, and a third memory controller 345. The processor 183, the first memory controller 325, the second memory controller 335, and the third memory controller 345 may be connected to one another via the internal bus 186. Furthermore, the first memory controller 325 may control the first DRAM 320, the second memory controller 335 may control the second DRAM 330, and the third memory controller 345 may control the flash memory 340.

The processor 183 may include a plurality of cores. Although FIG. 6 illustrates that the processor 183 includes quad cores (four cores 311, 312, 313, and 314), the disclosure is not limited thereto. Furthermore, the flash memory 340 is a non-volatile memory device as described above with reference to FIG. 2, whereas the first DRAM 320 and the second DRAM 330 are volatile memory devices as described above with reference to FIG. 2.

The flash memory 340 may include an OS, a first application program, and a second application program. Here, the first application program may be a program for receiving state information regarding an IoT device from the IoT device and transmitting received state information to a server. Furthermore, the second application program may be a program that performs main functions (e.g., a broadcast receiving function, an image processing function, an image displaying function, etc.) of the image display apparatus 100.

When booting of the image display apparatus 100 is initiated, the processor 183 may transmit a first control signal to the third memory controller 345. In response to the first control signal, the third memory controller 345 may read out an OS stored in the flash memory 340, and the first memory controller 325 may control the first DRAM 320 to load the read-out OS.

For example, an OS may control the first DRAM 320 to load a first application program and the second DRAM 330 to load a second application program by using a page table. Here, a page refers to a unit obtained by equally dividing an application program into units of pages, and storing and executing an application in a main memory (a first DRAM and a second DRAM) by pages is referred to as paging. Furthermore, a table indicating frames for respectively storing pages included in an application program is referred to as a page table, where the page table may be managed by an OS.

A page table according to an example embodiment may be configured to store pages included in a first application program in the first DRAM 320 and store pages includes in a second application program in the second DRAM 330.

In the normal mode, the processor 183 may execute the first application program loaded to the first DRAM 320 and the second application program loaded to the second DRAM 330.

Therefore, the image display apparatus 100 may receive a broadcast, process received broadcast images, and display the processed broadcast images on a display. For example, as illustrated in FIG. 7, the image display apparatus 100 may display images on the display 120 in the normal mode. For example, the image display apparatus 100 may display a video included in a broadcast signal received via a tuner or display content (e.g., moving pictures) input via a communicator or an input/output unit on a display. Alternatively, the image display apparatus 100 may display images stored in a storage unit.

Furthermore, the image display apparatus 100 may collect sensing data sensed by an IoT device (state information regarding the IoT device) and transmit the collected sensing data to the server 10.

Alternatively, as illustrated in FIG. 7, the image display apparatus 100 may analyze collected sensing data and display state information regarding the IoT device 30 (e.g., state information regarding a robot cleaner (information indicating that the robot cleaner is being charged and is reserved to perform cleaning at 00:00), state information regarding an air conditioner (information indicating that the air cleaner is operating and a desired temperature is 00 degrees), state information regarding a washer (information indicating that the washer is washing and the washing will be over at 00:00), state information regarding an oven (information indicating that the oven is being pre-heated and a target temperature is 190 degrees), etc.). Here, the state information regarding the IoT device 30 may be displayed at a pre-set region of a display or may be displayed in a pop-up window.

Furthermore, the image display apparatus 100 may also transmit a control signal to the IoT device 30 based on collected sensing data. For example, if a room temperature sensed by a temperature sensor (an IoT device) is higher than a pre-set temperature (a suitable room temperature), the image display apparatus 100 may transmit an air conditioner operation control signal to an air conditioner (an IoT device). Furthermore, if illuminance of a room sensed by an illuminance sensor is lower than a pre-set illuminance, the image display apparatus 100 may transmit a signal for turning a lamp (an IoT device) ON to the lamp. Furthermore, if a room humidity sensed by a humidity sensor is higher than a pre-set humidity, the image display apparatus 100 may transmit an operation control signal to a dehumidifier. However, the disclosure is not limited thereto.

Figure 8:
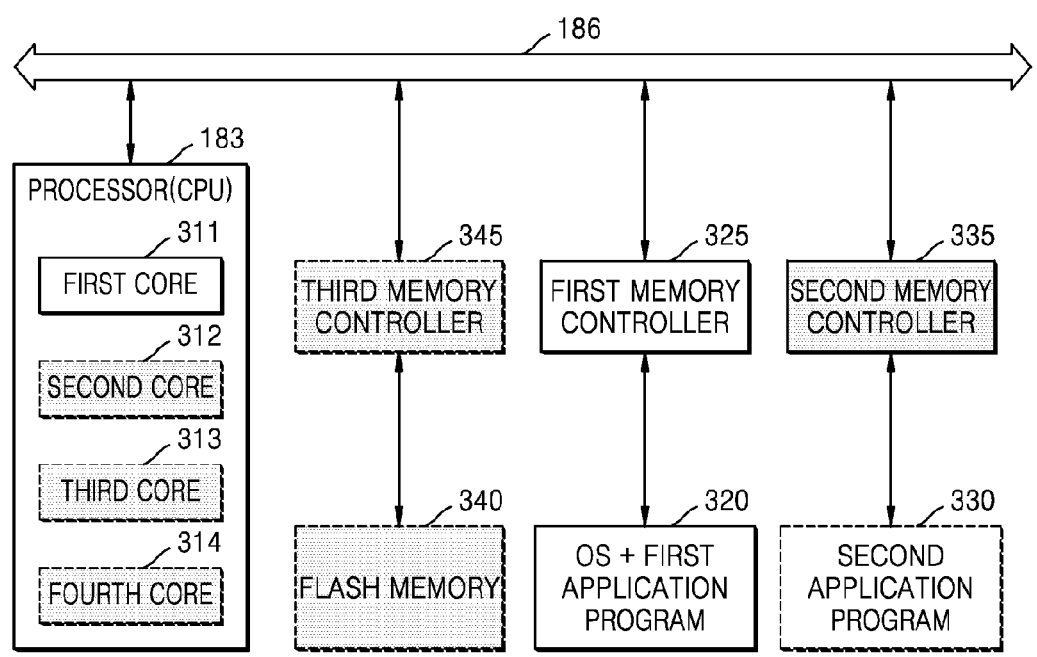
FIGS. 8 and 9 are diagrams illustrating a case in which an image display apparatus according to an example embodiment operates in an IoT mode.
Figure 9:
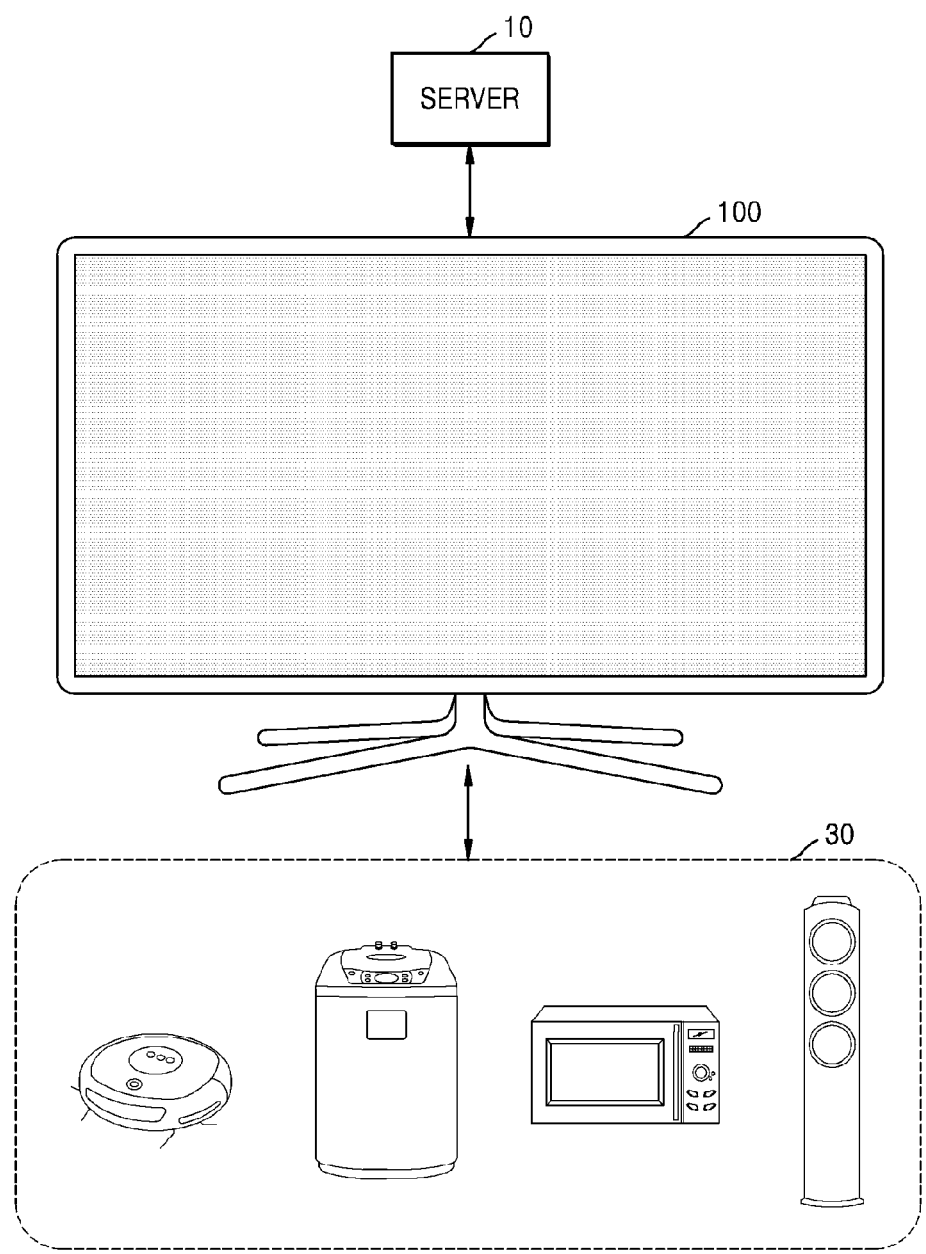

FIGS. 8 and 9 are diagrams illustrating a case in which an image display apparatus according to an example embodiment operates in an IoT mode.

Referring to FIG. 8, when an input for turning the image display apparatus 100 OFF is received, the image display apparatus 100 may be switched to the IoT mode. Alternatively, the image display apparatus 100 may be switched to the IoT mode when no signal is input to the image display apparatus 100 for a certain time period, the image display apparatus 100 operates in a power-saving mode, or power supply to the image display apparatus 100 is stopped and resumed.

When the image display apparatus 100 is switched from the normal mode to the IoT mode, it is not necessary to perform main functions of an image display apparatus (e.g., a broadcast receiving function, an image processing function, an image displaying function, etc.), the processor 183 may suspend a second application program loaded to the second DRAM 330. For example, the second memory controller 335 may transmit a self refresh command to the second DRAM 330, and the second DRAM 330 may refresh itself and maintain the second application program suspended.

Here, since it is not necessary for the second memory controller 335 to periodically transmit refresh commands to the second DRAM 330, power supply to the second memory controller 335 may be blocked.

Furthermore, since the main functions of an image display apparatus (e.g., a broadcast receiving function, an image processing function, an image displaying function, etc.) are not performed in the IoT mode, power supply to hardware resources for performing the main functions may also be blocked. For example, power supply to hardware resources for processing received video data (e.g., various image processing operations including decoding, scaling, noise filtering, frame rate transformation, and resolution transformation with regard to the video data) or hardware resources for processing audio data (e.g., various processing operations including decoding, amplification, and noise filtering with regard to the audio data) may be blocked.

Furthermore, when an image display apparatus is switched from the normal mode to the IoT mode, the processor 183 may store data for executing a first application program, which is stored in the flash memory 340, in the user input unit 230. Furthermore, power supply to the third memory controller 345, which controls the third memory controller 345, and the flash memory 340 may be blocked.

The processor 183 according to an example embodiment may deactivate some of a plurality of cores. For example, the processor 183 may deactivate three cores (a second core 312, a third core 313, and a fourth core 314) out of four cores and may activate only one core (a first core 311). However, the disclosure is not limited thereto. The activated first core 311 may execute a first application program loaded to the first DRAM 320.

Therefore, as illustrated in FIG. 9, the image display apparatus 100 may receive sensing data (state information regarding the IoT device 30) sensed by the IoT device 30 (e.g., a robot cleaner, a washer, an oven, an air conditioner, etc.) and transmit received sensing data to the server 10. Here, the server 10 may be a device or a server that provides services to a user by using received sensing data.

The server 10 may generate a control signal for controlling the IoT device 30 based on sensing data received from an image display apparatus. For example, if a room temperature sensed by a temperature sensor (an IoT device) is higher than a pre-set temperature (a suitable room temperature), the server 10 may generate a control signal for operating an air conditioner (an IoT device). Furthermore, if illuminance of a room sensed by an illuminance sensor is lower than a pre-set illuminance, the server 10 may generate a control signal for turning a lamp (an IoT device) ON to the lamp. Furthermore, if a room humidity sensed by a humidity sensor is higher than a pre-set humidity, the server 10 may generate a control signal for operating a dehumidifier. However, the disclosure is not limited thereto. The server 10 may transmit a control signal to the image display apparatus 100, and the image display apparatus 100 may transmit the received control signal to the corresponding IoT device 30.

Furthermore, the first core 311 may increase the frequency of a core driving signal during a period for collecting sensing data of the IOT device 30 and may lower the frequency of a core driving signal during a period in which no sensing data is collected. Furthermore, the communicator 150 may be activated during a period in which sensing data regarding the IOT device 30 is collected or collected data is transmitted to an external device, whereas the communicator 150 may be deactivated during a period in which no sensing data is collected.

Furthermore, the first core 311 may store sensing data regarding the IOT device 30 (state information regarding the IOT device 30) in a storage area of the first DRAM 320.

As described above, the image display apparatus 100 may reduce power consumption as much as possible by executing a first application program by using only some of cores (the first core 311) in the IoT mode.

Meanwhile, when the image display apparatus 100 is switched from the IoT mode back to the normal mode, the plurality of cores included in the processor 183 may be re-activated.

For example, when the image display apparatus 100 receives a user input for turning the image display apparatus 100 ON when the image display apparatus 100 is OFF, the image display apparatus 100 may be switched to the normal mode, where the deactivated second through fourth cores 312, 313, and 314 may be activated.

Furthermore, in the normal mode, it may be necessary to perform the main functions (e.g., a broadcast receiving function, an image processing function, an image displaying function, etc.) of the image display apparatus 100, and thus the processor 183 may activate the suspended second application program. For example, the processor 183 may operate the second memory controller 335 and the second memory controller 335 may periodically transmit refresh commands to the second DRAM 330, thereby resuming an operation of the suspended second application program. Therefore, the main functions (e.g., a broadcast receiving function, an image processing function, an image displaying function, etc.) of the image display apparatus 100 may be performed.

Figure 10:
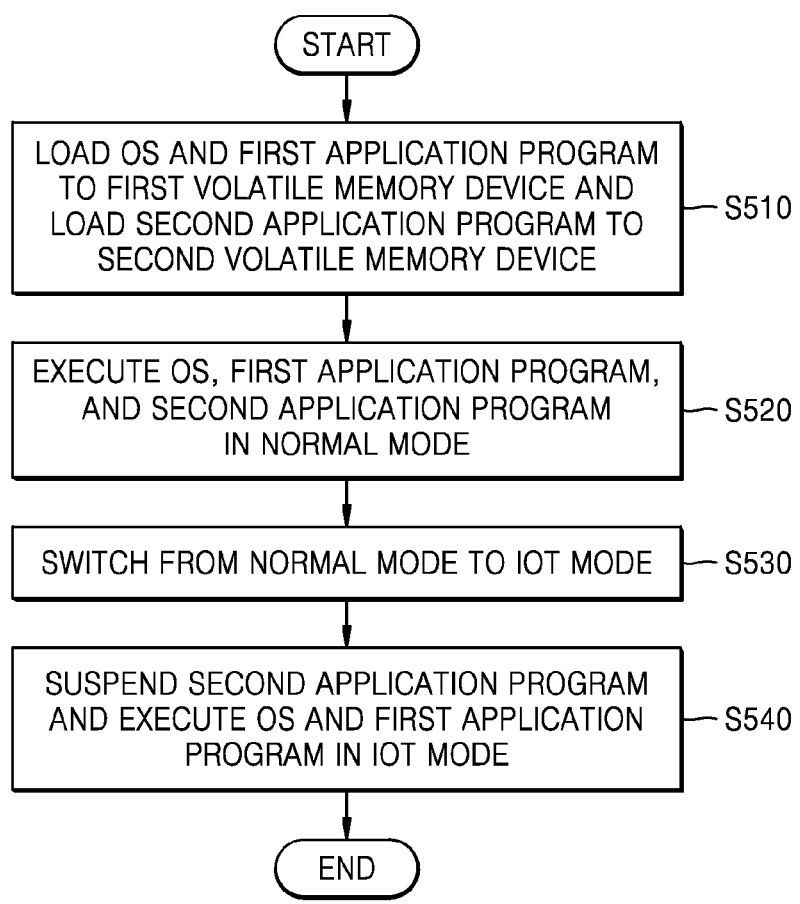
FIG. 10 is a flowchart illustrating an example method of operating an image display apparatus, according to an example embodiment.

FIG. 10 is a flowchart illustrating an example method of operating an image display apparatus, according to an example embodiment.

Referring to FIG. 10, the image display apparatus 100 may load an OS and a first application program to a first volatile memory device and load a second application program to a second volatile memory (operation S510).

An OS, a first application program, and a second application program may be stored in the non-volatile memory device 141 of the image display apparatus 100. When booting of the image display apparatus 100 is initiated, the image display apparatus 100 may load the OS stored in the non-volatile memory device 141 to the first volatile memory device.

The OS may control the image display apparatus 100 to load the first application program to the first DRAM 320 and load the second application program to the second DRAM 330. Here, the first application program may be a program for receiving state information regarding an IoT device from the IoT device and transmitting received information to a server. Furthermore, the second application program may be a program that performs the main functions (e.g., a broadcast receiving function, an image processing function, an image displaying function, etc.) of the image display apparatus 100.

In the normal mode, the image display apparatus 100 may execute the OS, the first application program, and the second application program (operation S520).

When the OS, the first application program, and the second application program are executed, the image display apparatus 100 may receive a broadcast, process received broadcasting images, and display the processed images on a display. Furthermore, the image display apparatus 100 may receive sensing data sensed by the IoT device and transmit the received sensing data to an external device.

The image display apparatus 100 may be switched from the normal mode to the IoT mode (operation S530).

For example, when an input for turning the image display apparatus 100 OFF is received, the image display apparatus 100 may be switched to the IoT mode. Alternatively, the image display apparatus 100 may be switched to the IoT mode when no signal is input to the image display apparatus 100 for a certain time period, the image display apparatus 100 operates in a power-saving mode, or power supply to the image display apparatus 100 is stopped and resumed.

In the IoT mode, the image display apparatus 100 may suspend the second application program and execute the OS and the first application program (operation S540).

For example, the image display apparatus 100 may transmit a self refresh command to the second DRAM 330, and the second DRAM 330 may refresh itself and maintain the second application program suspended.

Furthermore, the image display apparatus 100 may deactivate some of a plurality of cores. For example, if the processor 183 includes four cores, three cores (a second core, a third core, and a fourth core) out of the four cores may be deactivated and only one core (a first core) may be activated. However, the disclosure is not limited thereto. The core other than the deactivated cores may execute the OS and the first application program.

When the OS and the first application program are executed, the image display apparatus 100 may receive sensing data sensed by an IoT device and transmit the received sensing data to an external device.

Figure 11:
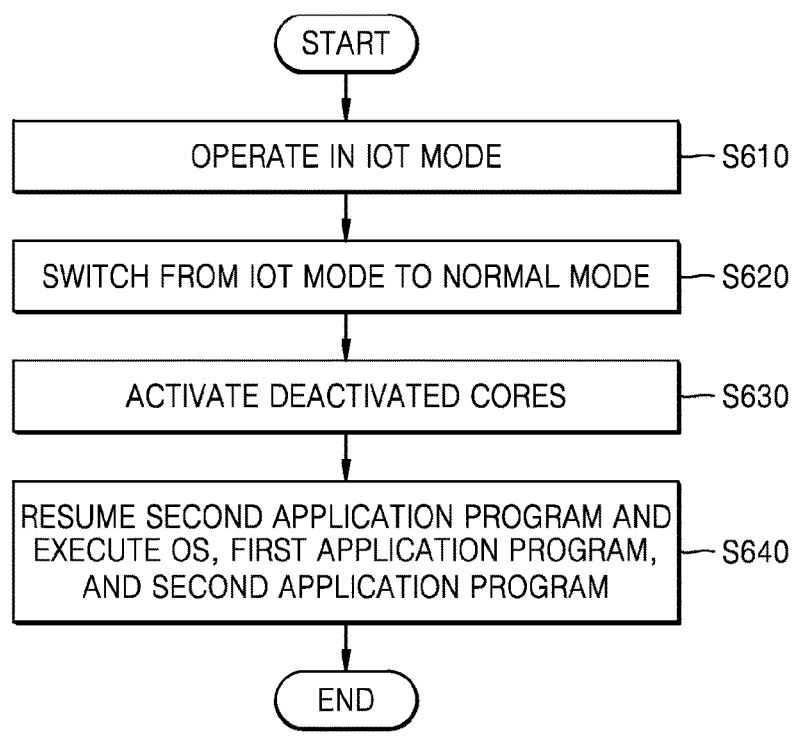
FIG. 11 is a flowchart illustrating an example method of operating an image display apparatus, according to an example embodiment.

FIG. 11 is a flowchart illustrating an example method of operating an image display apparatus, according to an example embodiment.

Referring to FIG. 11, the image display apparatus 100 may operate in the IoT mode (operation S610).

Since the operation S610 corresponds to the operation S540 of FIG. 10, detailed description thereof will be omitted.

When the image display apparatus 100 is OFF and a user input for turning the image display apparatus 100 ON is detected, the image display apparatus 100 may be switched to the normal mode (operation S620).

When the image display apparatus 100 is switched to the normal mode, the image display apparatus 100 may activate deactivated cores (operation S630).

For example, if three cores (a second core, a third core, and a fourth core) out of four cores included in a process are deactivated in the IoT mode, the image display apparatus 100 may activate the second through fourth cores.

The image display apparatus 100 may activate a second application program and execute an OS, a first application program, and the second application program (operation S640).

For example, the image display apparatus 100 may periodically transmit refresh commands to a second RAM and resume an operation of the suspended second application program. Therefore, the main functions (e.g., a broadcast receiving function, an image processing function, an image displaying function, etc.) of the image display apparatus 100 may be performed.

Since an image display apparatus according to an embodiment may perform functions of a hub of an IoT system, no separate IoT hub is needed by the IoT system.

According to an example embodiment, since state information may be received from an IOT device and transmitted to an external device without consuming much power even when an image display apparatus is turned OFF, power consumption may be significantly reduced.

The above-described example embodiments of the disclosure may be implemented as programmable instructions executable by a variety of computer components and stored in a non-transitory computer readable recording medium. The non-transitory computer readable recording medium may include program instructions, a data file, a data structure, or any combination thereof. The program instructions stored in the non-transitory computer readable recording medium may be designed and configured specifically for the disclosure or can be publicly known and available to those of ordinary skill in the field of software. Examples of the non-transitory computer readable recording medium include a hardware device specially configured to store and perform program instructions, for example, a magnetic medium, such as a hard disk, a floppy disk, and a magnetic tape, an optical recording medium, such as a CD-ROM, a DVD, and the like, a magneto-optical medium, such as a floptical disc, a ROM, a RAM, a flash memory, and the like. Examples of the program instructions include machine codes made by, for example, a compiler, as well as high-level language codes executable by a computer using an interpreter.

It should be understood that the various example embodiments described herein should be considered in a descriptive sense only and not for purposes of limitation. Descriptions of features or aspects within each embodiment should typically be considered as available for other similar features or aspects in other embodiments.

While one or more example embodiments have been described with reference to the figures, it will be understood by those of ordinary skill in the art that various changes in form and details may be made therein without departing from the spirit and scope as defined by the following claims.

What is claimed is:

1. An image display apparatus comprising:
    a non-volatile memory device configured to store an operating system (OS), a first application program, and a second application program; and
    a processor configured to:
    load the OS and the first application program into a first area of a volatile memory device,
    load the second application program into a second area of the volatile memory device,
    execute the OS, the first application program, and the second application program in a normal mode, and
    in response to an event, continue the execution of the OS and the first application program loaded into the first area of the volatile memory device, and suspend the second application program loaded into the second area of the volatile memory device, the event comprising at least one of an input for turning the image display apparatus off, and a detection event detecting that the image display apparatus enters a low power mode,
    wherein the first application program includes a program configured to receive state information regarding an IOT device and to transmit the received state information to a server, and
    the second application program includes a program configured to perform one or more of a broadcast receiving function, an image processing function, and an image displaying function.

2. The image display apparatus of claim 1, wherein the processor comprises a plurality of cores, and,
    when the second application program is suspended, at least one of the plurality of cores are deactivated, and a core other than the at least one deactivated core executes the OS and the first application program loaded in the first area of the volatile memory device.

3. The image display apparatus of claim 1, further comprising:
    a first memory controller configured to control the first area of the volatile memory device; and
    a second memory controller configured to control the second area of the volatile memory device,
    wherein, when the second application program is suspended, the second memory controller is further configured to transmit a self refresh command to the second area of the volatile memory device, and
    the processor is further configured to turn the second memory controller OFF.

4. The image display apparatus of claim 1, further comprising a third memory controller configured to control the non-volatile memory device,
    wherein, when the second application program is suspended, the processor is further configured to load data, which is stored in the non-volatile memory device and is necessary for executing the first application program, to the first area of the volatile memory device and turn the non-volatile memory device and the third memory controller OFF.

5. The image display apparatus of claim 2, wherein, when the image display apparatus is switched to the normal mode, the at least one deactivated core from among a plurality of cores included in the processor are activated, and
    the plurality of cores resume the suspended second application program and execute the second application program.

6. The image display apparatus of claim 2, wherein the activated core consumes less power than in the normal mode.

7. A method of operating an image display apparatus, the method comprising:
    loading an operating system (OS) and a first application program into a first area of a volatile memory device and loading a second application program into a second area of the volatile memory device;
    executing the OS, the first application program, and the second application program in a normal mode; and
    in response to an event, continuing execution of the OS and the first application program loaded into the first area of the volatile memory device, and suspending the second application program loaded into the second area of the volatile memory device and executing the OS and the first application program loaded into the first area of the volatile memory device, the event comprising at least one of an input for turning the image display apparatus off, and a detection event detecting that the image display apparatus enters a low power mode,
    wherein the first application program includes a program configured to receive state information regarding an Internet-of-Things (IOT) device and to transmit the received state information to a server, and
    the second application program includes a program configured to perform one or more of a broadcast receiving function, an image processing function, and an image displaying function.

8. The method of claim 7, wherein the suspending of the second application program and the executing of the OS and the first application program comprises deactivating one or more of a plurality of cores of a processor and executing the OS and the first application program using a core other than the deactivated cores.

9. The method of claim 7, wherein the suspending of the second application program loaded into the second area of the volatile memory device and the executing of the OS and the first application program comprises:
    transmitting a self refresh command to the second area of the volatile memory device; and
    turning a second memory controller that controls the second area of the volatile memory device OFF.

10. The method of claim 7, wherein the suspending of the second application program loaded into the second area of the volatile memory device and the executing of the OS and the first application program comprises:

loading data, which is stored in a non-volatile memory device and is necessary for executing the first application program, into the first area of the volatile memory device; and turning the non-volatile memory device and a third memory controller that controls the non-volatile memory device OFF.

11. The method of claim 8, further comprising:
switching to the normal mode;
activating the at least one core deactivated from among the plurality of cores included in the processor; and
resuming the suspended second application program and executing the first application program and the second application program.

12. The method of claim 11, wherein the at least one activated core consumes less power than in the normal mode.

13. A non-transitory computer readable recording medium having recorded thereon a computer program for implementing the method of claim 7.

* * * * *